US009667172B2

(12) United States Patent
Schoenlinner et al.

(10) Patent No.: US 9,667,172 B2
(45) Date of Patent: May 30, 2017

(54) INVERTER

(71) Applicant: Dr. Johannes Heidenhain GmbH, Traunreut (DE)

(72) Inventors: Markus Schoenlinner, Tittmoning (DE); Michael Wichmann, Rosenheim (DE); Christian von Le Suire, Chieming (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 498 days.

(21) Appl. No.: 13/851,589

(22) Filed: Mar. 27, 2013

(65) Prior Publication Data
US 2013/0258737 A1  Oct. 3, 2013

(30) Foreign Application Priority Data

Apr. 2, 2012  (DE) .................. 10 2012 205 335

(51) Int. Cl.
*G05F 1/70* (2006.01)
*H02M 7/5387* (2007.01)
*H02M 7/487* (2007.01)

(52) U.S. Cl.
CPC ....... *H02M 7/53871* (2013.01); *H02M 7/487* (2013.01); *Y02B 70/1483* (2013.01)

(58) Field of Classification Search
None
See application file for complete search history.

(56) References Cited

U.S. PATENT DOCUMENTS

| 6,392,907 | B1 | 5/2002 | Ichikawa |
| 6,747,881 | B2* | 6/2004 | Schreiber ........................ 363/37 |
| 2008/0112200 | A1* | 5/2008 | Tan et al. ...................... 363/101 |
| 2013/0155747 | A1* | 6/2013 | Wang ............................ 363/132 |

* cited by examiner

*Primary Examiner* — Timothy J Dole
*Assistant Examiner* — Monica Mata
(74) *Attorney, Agent, or Firm* — Andrews Kurth Kenyon LLP

(57) ABSTRACT

An inverter for the selective feeding of effective power and reactive power into a power grid has two serially connected intermediate circuit capacitors, the joint connection of which defines a median voltage level between a positive voltage level and a negative voltage level. It also has first, second, third, and fourth semiconductor switches having free-wheeling diodes respectively connected in parallel, which are arranged serially in this sequence between the positive and the negative voltage levels, the joint connection of the second and third semiconductor switches being connected to the power grid via a choke. The inverter also has serially connected first and second diodes, the joint connection of which is at the median voltage level, and whose second connection is connected to the joint connection of the first and second semiconductor switches and of the third and fourth semiconductor switches. Joint connections of two of the first to fourth semiconductor switches are connected to additional chokes, which by additional semiconductor switches form switchable paths for accepting free-wheeling currents. In this manner, it is possible to avoid putting stress on diodes as a result of the reverse recovery effect.

10 Claims, 6 Drawing Sheets

INVERTER

CROSS-REFERENCE TO RELATED APPLICATIONS

The present application claims priority to Application No. 10 2012 205 335.2, filed in the Federal Republic of Germany on Apr. 2, 2012, which is expressly incorporated herein in its entirety by reference thereto.

FIELD OF THE INVENTION

The present invention relates to an inverter for feeding electrical energy into a power grid. The present invention further relates to a method for operating such an inverter.

BACKGROUND INFORMATION

Inverters are used to convert a DC voltage into an AC voltage. In particular in the area of photovoltaics, the highest possible efficiencies are required in this connection.

Solar modules for converting sunlight into electrical energy initially supply a direct current, which must be converted into an alternating current prior to being fed into the power grids of the electric utility companies. Inverters are used for this purpose as described, for example, in U.S. Pat. No. 6,392,907. The electrical energy stored in the capacitors of an intermediate circuit is output to the power grid via a series connection of multiple semiconductor switches. In so-called 3-level inverters, during the positive half wave of the power grid and for feeding in effective power, the system switches back and forth between a median voltage level and a high, positive voltage level of the intermediate circuit in order to approximate the currently required voltage for example by pulse-width modulation (PWM). During the negative half wave of the power grid, the system switches between the median and a negative voltage level of the intermediate circuit. The infeed into the power grid occurs via a power choke, by which the AC voltage produced through quick switching between the three voltage levels is smoothed. In this manner, an AC voltage suitable for an infeed is generated separately for each phase of the power grid.

U.S. Pat. No. 6,392,907, mentioned above, explains a problem occurring in such an inverter as a result of the quick switching operations. An inverter requires a great variety of diodes and semiconductor switches, which in certain operating states are in danger of being destroyed, e.g., if a current flowing in the diode is switched off too abruptly by a reversal of the polarity of the diode in the blocking direction. This is because for a brief moment following the polarity reversal a diode is conductive in the blocking direction since charge carriers are still present in the blocking zone. Because of this effect, which is also called the reverse recovery effect, it is necessary to limit the change of the current over time and thus the change of the voltage across the diode. U.S. Pat. No. 6,392,907 describes a passive circuit for performing this task.

Such a passive circuit, however, is not optimal in all operating states. Thus, currently, inverters used for feeding into power grids are also required to be able to feed in a certain proportion of reactive power in order to be able to ensure the stability of the power grids even when there is a high proportion of energy sources that feed in in a decentralized fashion. Since controlling rectifiers for feeding in reactive power differs markedly from controlling rectifiers for feeding in effective power, passive design approaches are not optimal for avoiding the reverse recovery effect even with respect to the efficiency of an inverter.

SUMMARY

Example embodiments of the present invention provide an inverter for selectively feeding effective power and reactive power into a power grid, in which an option for avoiding the reverse recovery effect exists in every operating state.

Example embodiments of the present invention provide a method by which such a rectifier may be operated such that a destruction of electrical components is avoided both when feeding in effective power as well as when feeding in reactive power.

According to example embodiments of the present invention, an inverter for selectively feeding effective power and reactive power into a power grid has two serially connected intermediate circuit capacitors, the joint connection of which defines a median voltage level between a positive voltage level and a negative voltage level. It also has first, second, third and fourth semiconductor switches having free-wheeling diodes respectively connected in parallel, which are arranged serially in this sequence between the positive and the negative voltage levels, the joint connection of the second and third semiconductor switches being connected to the power grid via a choke. The inverter also has serially connected first and second diodes, the joint connection of which is at the median voltage level, and whose respectively second connection is connected to the joint connection of the first and the second semiconductor switches and respectively of the third and fourth semiconductor switches. Joint connections of respectively two of the first to fourth semiconductor switches are connected to additional chokes, which together with additional semiconductor switches form switchable paths for accepting free-wheeling currents.

According to example embodiments of the present invention, in a method for operating such a rectifier, the rectifier is operated as a three-point rectifier in that the joint connection of the second and the third semiconductor switches is switched back and forth either between the median voltage level and the positive voltage level or between the median voltage level and the lower voltage level by switching processes of the first to fourth semiconductor switches in accordance with the voltage in the power grid, the switching processes of the first to fourth semiconductor switches being accompanied by switching processes of the additional semiconductor switches such that the additional chokes connected to the joint connections accept temporarily occurring free-wheeling currents.

This ensures that in good time prior to critical switching operations of the first to fourth semiconductor switches, a slow change is produced in the voltage applied across the endangered diodes in that free-wheeling currents are overtaken by one of the additional chokes and thereby a slow change in potential is effected on the endangered diode. A reverse recovery effect may thus be effectively prevented regardless of whether effective power or reactive power is currently fed in, and the respectively utilized circuit may be optimized such that the rectifier overall may be operated at an improved efficiency.

Further features and aspects of example embodiments of the present invention are described in more detail below with reference to the appended Figures.

DETAILED DESCRIPTION

Figure 1A:
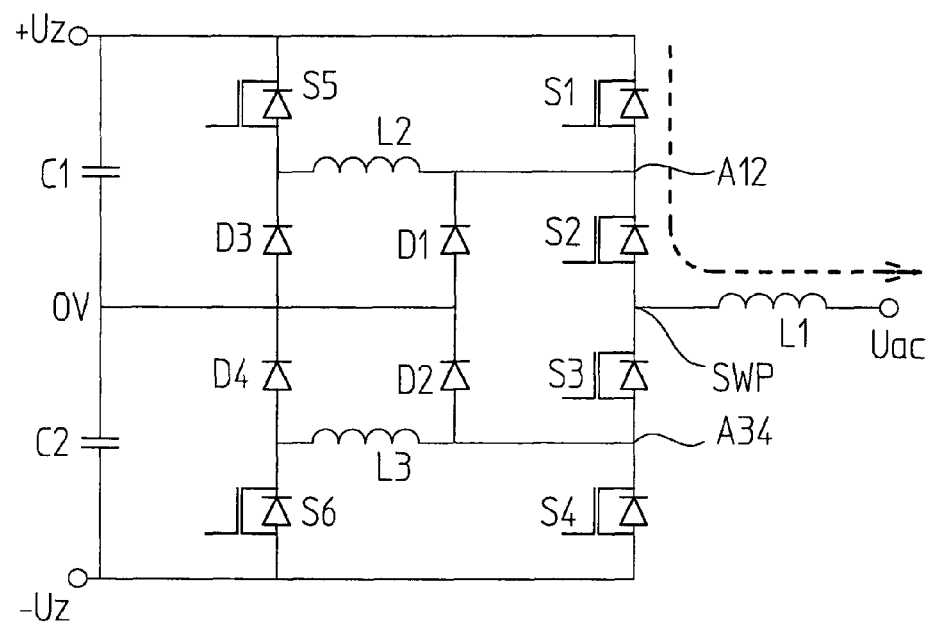
FIGS. 1a to 1d illustrate a subcircuit of the rectifier for feeding in effective power together with the method steps required for this purpose.

FIG. 1a (like FIGS. 1b to 1d) shows the basic circuit of a 3-level rectifier. Two serially connected intermediate circuit capacitors C1, C2, whose joint connection defines a median voltage level 0V between a positive voltage level +Uz and a negative voltage level −Uz, form the intermediate circuit, in which electrical energy from the connected solar modules may be stored. In this context, the median voltage level 0V is not necessarily to be equated with ground potential.

Between positive voltage level +Uz and negative voltage level −Uz, first, second, third and fourth semiconductor switches S1, S2, S3, S4 having respectively parallel-connected free-wheeling diodes are connected in series.

Joint connection SWP of second and third semiconductor switches S2, S3 are connected to the power grid Uac via a choke L1.

The joint connection of two serially connected first and second diodes D1, D2 is connected to median voltage level 0V, the second connection of first diode D1 is connected to the joint connection of first and second semiconductor switches S1, S2, the second connection of second diode D2 is connected to the joint connection of third and fourth semiconductor switches S3, S4.

During a positive half wave in power grid Uac, it is possible to switch back and forth between median voltage level 0V and upper voltage level +Uz by opening switches S3 and S4 and closing switch S2, as well as by the clocked operation of switch S1 on the joint connection SWP of second and third semiconductor switches S2, S3. If S1 is closed, then D1 is blocking and SWP is at +Uz. If S1 is open, then SWP via D1 is at 0V. For this purpose, S1 may be controlled, for example, by pulse width modulation (PWM) such that on average over time a voltage may be set that tracks the power grid voltage such that an approximately sinusoidal alternating current sets in in choke L1 and is output to the power grid. In other words, choke L1 filters the high switching frequency (PWM frequency, normally several kHz), by which first semiconductor switch S1 is clocked, and smoothens on the power grid side the quick switchover between the two voltage levels 0V and +Uz to obtain a sinusoidal current characteristic.

Analogously, a sinusoidal current characteristic may be set during the negative half wave of the power grid voltage in that switch S4 is clocked according to a PWM pattern when switches S1, S2 are open and switch S3 is closed.

As explained above, first semiconductor switch S1 is clocked during a positive half wave of power grid Uac, while second semiconductor S2 remains permanently closed. FIG. 1a shows that when S1 is closed a current flows from positive voltage level +Uz via choke L1 into the power grid. If in the case of a positive power grid voltage current flows from the positive voltage level into the power grid, then the current and the voltage have the same sign, and effective power is output into the power grid.

Figure 1B:
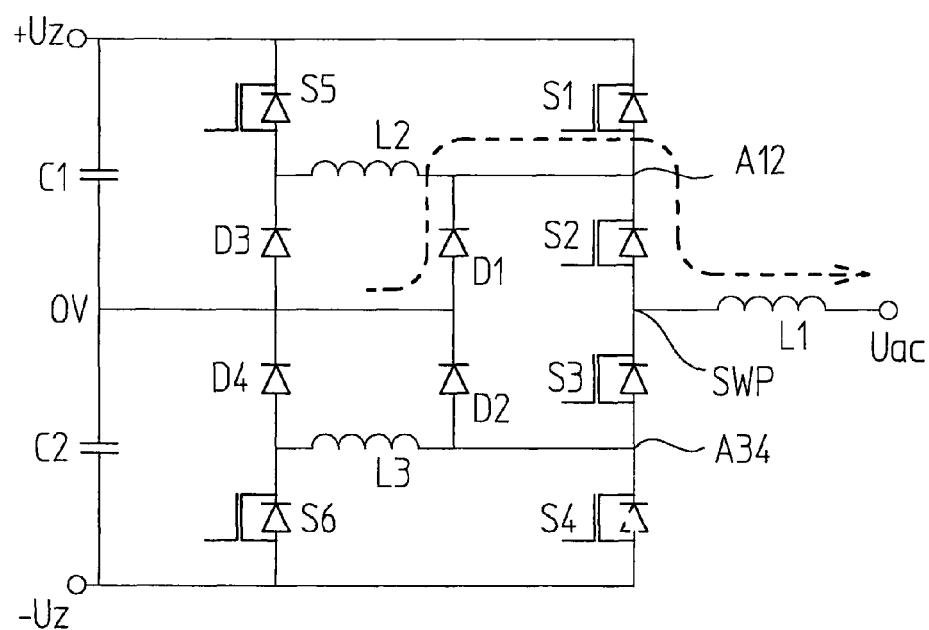

FIG. 1b shows the situation following the opening of first semiconductor switch S1. From the moment S1 is opened, the current through L1 is drawn as a free-wheeling current from the median voltage level 0V and flows via D1 and S2. If one were simply to close S1 again in the next step, then D1 would not block immediately, but would rather be conductive for a brief moment due to the reverse recovery effect. Due to the high voltage difference between 0V and +Uz (several 100V in a typical photovoltaic facility), diode D1 would be highly stressed.

FIG. 1a (like FIGS. 1b to 1d) also illustrates the circuit extension that is able to prevent diodes from being stressed by the reverse recovery effect in the event of an output of effective power.

For this purpose, joint connection A12 of first and second semiconductor switches S1, S2 is connected to a second choke L2, whose second connection is connected via a third diode D3 to the median voltage level 0V and via a fifth semiconductor switch S5 to the positive voltage level +Uz. Likewise, joint connection A34 of third and fourth semiconductor switches S3, S4 is connected to a third choke L3, whose second connection is connected via a fourth diode D4 to the median voltage level 0V and via a sixth semiconductor switch S6 to the negative voltage level −Uz.

Figure 1C:
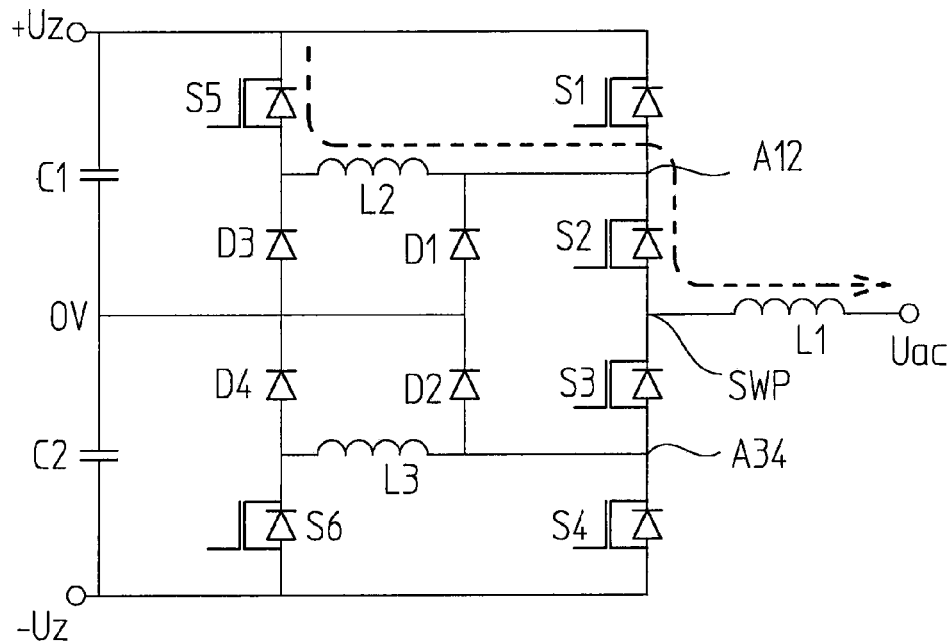

If, as illustrated in FIG. 1b, the free-wheeling current flows from the median voltage level 0V via D1, S2 and L1 into power grid Uac, then switch S1 is not closed in the next step, but rather the previously open fifth semiconductor switch S5 is closed such that the free-wheeling current flowing at this moment, coming from positive voltage level +Uz and continuously rising, as illustrated in FIG. 1c, is taken over by second choke L2 via fifth semiconductor switch S5. The joint connection A12 of first and second semiconductor switches S1, S2 is thus brought back to or near to the positive voltage level +Uz before first semiconductor switch S1 is closed again and fifth semiconductor switch S5 is opened again.

Figure 1D:
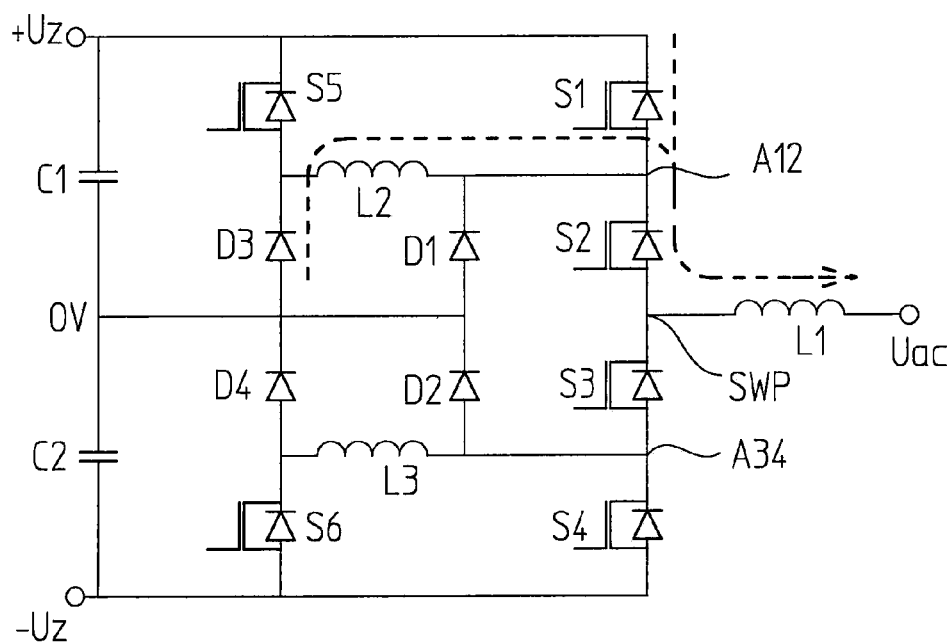

As shown in FIG. 1d, a decaying free-wheeling current then flows through L2, which is fed via D3 from median voltage level 0V. Moreover, a current flows again from positive voltage level +Uz into the power grid, and the cycle begins anew.

It is thus important that prior to switching S1 on again the additional fifth semiconductor switch S5 is briefly closed and that thus a free-wheeling current, which initially flowed via D1, is overtaken by additional choke L2. The slowly rising current flowing through this choke ensures a slow rise in the potential on joint connection A12, and thus avoids the reverse recovery effect in diode D1 when S1 is closed again.

The conditions and method steps in the operation of the rectifier during a negative half wave of the power grid Uac are analogous.

Initially, when S4 is closed, current flows from the power grid to the negative voltage level −Uz, that is, effective power is again output to the power grid. After S4 has been opened, a free-wheeling current flows via D2 to median voltage level 0V. An immediate renewed closure of S4 would put great stress on D2 due to the reverse recover effect, and therefore S6 is first closed and the free-wheeling current is overtaken by L3. The joint connection A34 is thus charged again slowly to the negative potential −Uz before S4 is closed and S6 is at the same time opened again. A decaying free-wheeling current is then still able to flow via D4.

FIGS. 1a to 1d illustrate the conditions during the infeed of effective power. FIGS. 2a to 2d show the conditions during the infeed of reactive power. The infeed of reactive power means that in the event of a positive power grid voltage a current flows from power grid Uac to the rectifier and, e.g., in the event of a negative power grid voltage, a current flows from the rectifier into the power grid.

During the output of reactive power, other diodes of the rectifier are put at risk, which is why for this case another circuit extension is required. Even if, for the sake of clarity, the extensions of the basic circuit of a 3-level rectifier are represented separately in FIGS. 1a to 1d and 2a to 2d respectively for the two operating states "effective power" and "reactive power," they are nevertheless implemented in one single circuit and are activated as needed using the additional semiconductor switches contained in the circuit extensions.

According to a particularly simple circuit extension for the acceptance of free-wheeling currents during the output of reactive power, the joint connection SWP of second and third semiconductor switches S2, S3 is connected to a fourth choke L4, whose second connection is connected via a seventh semiconductor switch S7 to median voltage level 0V and via a fifth and sixth diode D5, D6 to positive voltage level +Uz and to negative voltage level −Uz respectively such that the fifth and sixth diodes are connected in series and in the blocking direction between the positive and negative voltage levels +Uz, −Uz.

Analogously to FIGS. 1a to 1d, FIGS. 2a to 2d illustrate the activation of the rectifier, in this case during the infeed of reactive power in the negative half wave of the power grid Uac.

For the purpose of feeding in reactive power during the negative half wave of power grid Uac, S1, S3 and S4 are open and S2 is operated in a clocked manner.

Figure 2A:
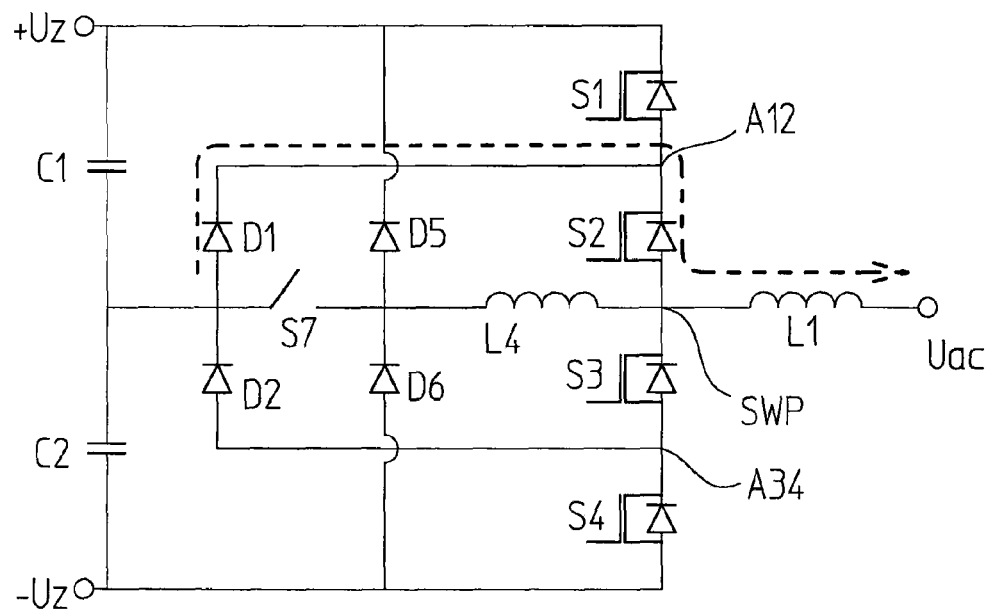
FIGS. 2a to 2d illustrate a subcircuit of the rectifier for feeding in reactive power together with the method steps required for this purpose.
Figure 2B:
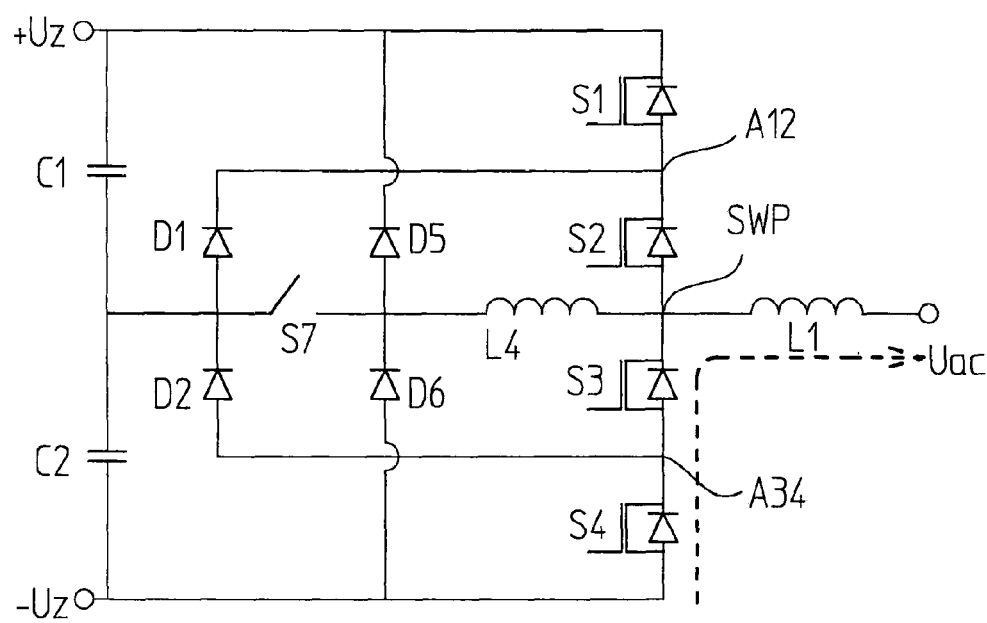

In the first step illustrated in FIG. 2a, current flows through choke L1 into power grid Uac, where a negative potential prevails at this time. This current is drawn from the median potential 0V of the intermediate circuit and flows via D1 and closed second semiconductor switch S2. In the following step, as illustrated in FIG. 2b, S2 is opened and the free-wheeling current is drawn by negative potential −Uz via the free-wheeling diodes respectively connected in parallel to third and fourth semiconductor switches S3, S4.

At the end of this second phase, SWP is at −Uz. If one were to close S2 again without any further measures and thus switch SWP rigidly to median voltage level 0V, the two free-wheeling diodes of S3 and S4 would not be able to block immediately due to the reverse recovery effect—and there would be a conductive connection between 0V and −Uz. The free-wheeling diodes would be destroyed.

Figure 2C:
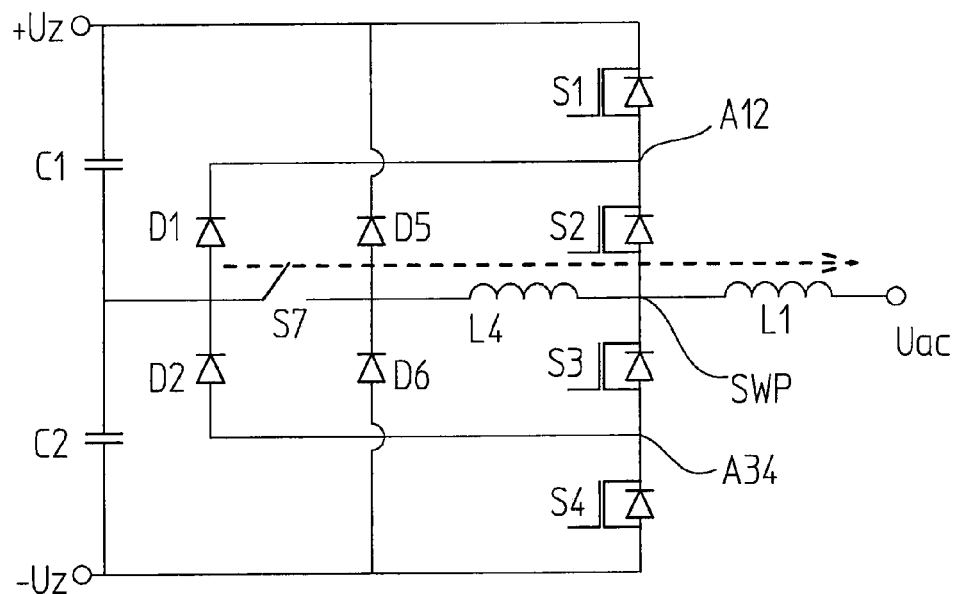
Figure 2D:
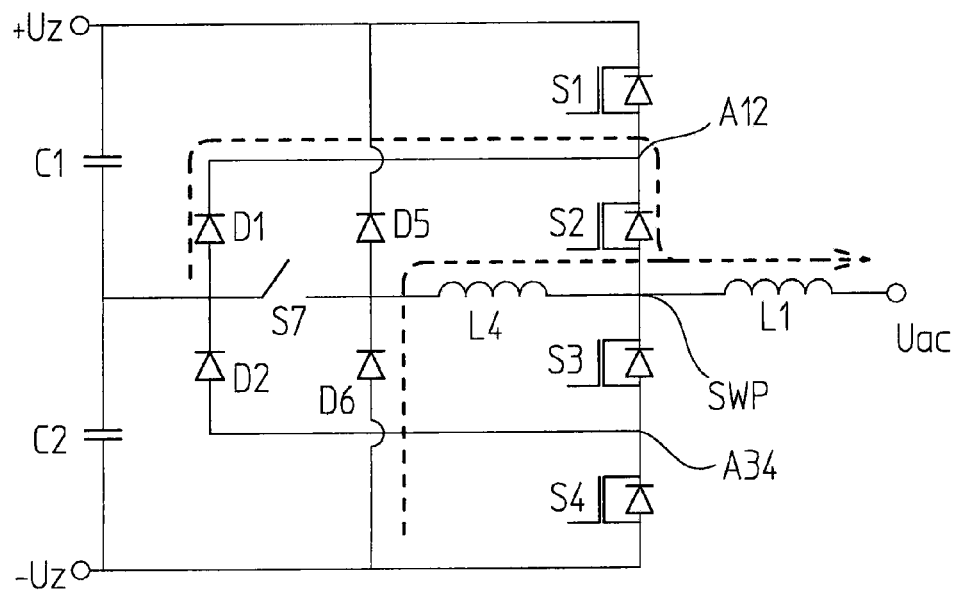

For this reason, first the previously open seventh semiconductor switch S7 is closed in the third step illustrated in FIG. 2c. The free-wheeling current through L1 is then overtaken by L4 in a slowly increasing manner, and the potential of SWP is slowly raised to the median voltage level 0V.

Only then is S2 closed again while S7 is at the same time opened, which now allows a current to flow again from the median potential 0V via D1 and S2. Furthermore, the current through L4—now coming from −Uz via D6—decays, and the phase illustrated in FIG. 2a begins anew.

The following applies for feeding in reactive power when there is a positive potential in power grid Uac: Current flows only through L1 into the rectifier. S1, S2 and S4 are open, S3 is operated in a clocked manner in order to set the required voltage, e.g., via a PWM method. Following the opening of S3, the free-wheeling current flows via the free-wheeling diodes of S1 and S2 such that SWP charges to +Uz. Prior to closing S3 again, S7 is closed in order to achieve via L4 a slow reduction of the potential on SWP to 0V. Only then is S3 closed while S7 is at the same time opened, the free-wheeling current in L4—coming via D5 from +Uz—decaying, and the cycle beginning anew.

Thus, if the basic circuit of a 3-level rectifier is equipped with the circuit extensions illustrated in FIG. 1a or 2a, one obtains a rectifier capable of feeding both effective power as well as reactive power into a power grid while avoiding stress on the diodes due to the reverse recovery effect by actively controlling the circuit extension. The extension that is, e.g., respectively not needed and thus not triggered remains inactive and does not unnecessarily impair the efficiency of the rectifier.

Figure 3:
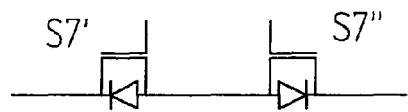
FIG. 3 illustrates bidirectional semiconductor switches.
Figure 3:
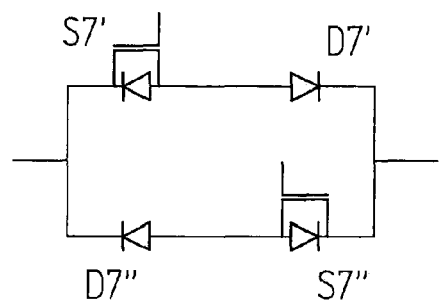

The seventh semiconductor switch S7, by which the circuit extension illustrated in FIGS. 2a to 2d is controlled, is arranged as a bidirectional switch. Two variants are indicated for this purpose in FIG. 3. In the one case (upper circuit), two MOSFETs ST and S7" are connected in series in opposite directions. If only one switch is conductive, then the switch as a whole functions as a diode. In order to improve the diode property further, it is also possible to use an antiparallel circuit of two MOSFETs S7', S7" (lower circuit), which in addition have in series one diode in the opposite direction as the internal body diode of the respective MOSFET.

Figure 4:
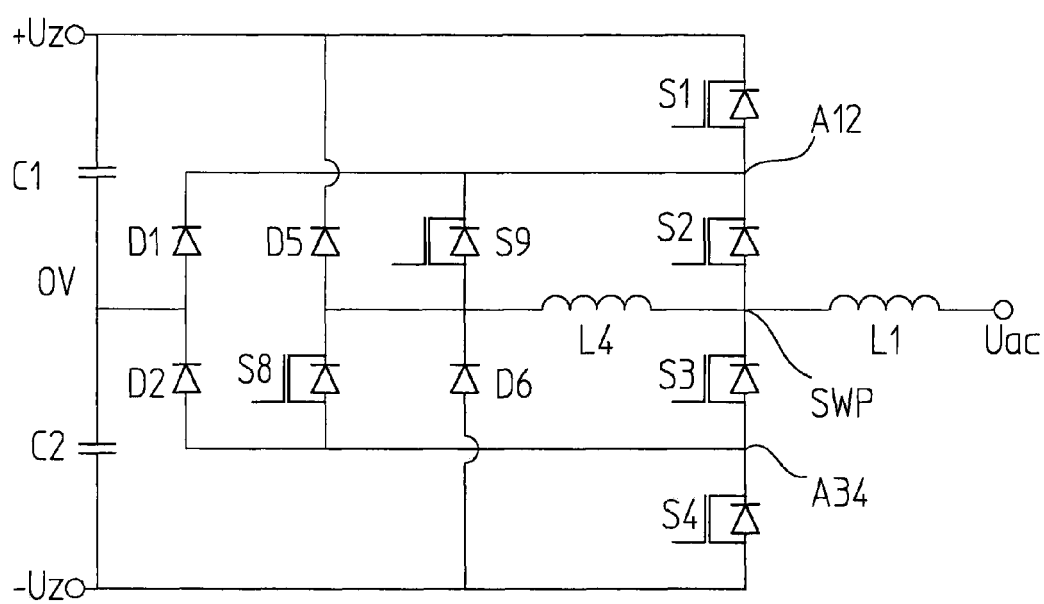
FIG. 4 illustrates a subcircuit of the rectifier for feeding in reactive power.

FIG. 4 illustrates a first alternative for the circuit extension illustrated in FIGS. 2a to 2d. The joint connection SWP of second and third semiconductor switches S2, S3 is connected to a fourth choke L4, the second connection of which is connected via an eighth semiconductor switch S8 and via second diode D2 as well as via a ninth semiconductor switch S9 and via first diode D1 to the median voltage level 0V. This second connection of the fourth choke is additionally connected via a fifth and a sixth diode D5, D6 to the positive voltage level +Uz and the negative voltage level −Uz, respectively. The fifth and sixth diodes are connected in series and in the blocking direction between the positive and negative voltage levels +Uz, −Uz.

This alternative circuit extension for feeding in reactive power is controlled analogously to the control process in the example illustrated in FIGS. 2a to 2d. While there, following the closure of S7, the free-wheeling current through L4 is drawn directly from median potential 0V, here the free-wheeling current flows via D1, S9 and L4 into the power grid (during the negative half wave of power grid Uac), or via L4, S8 and D2 from the power grid to median potential 0V (during the positive half wave of power grid Uac). Accordingly, S9 is thus operated in a clocked manner during the negative half wave, during the positive half wave.

Figure 5:
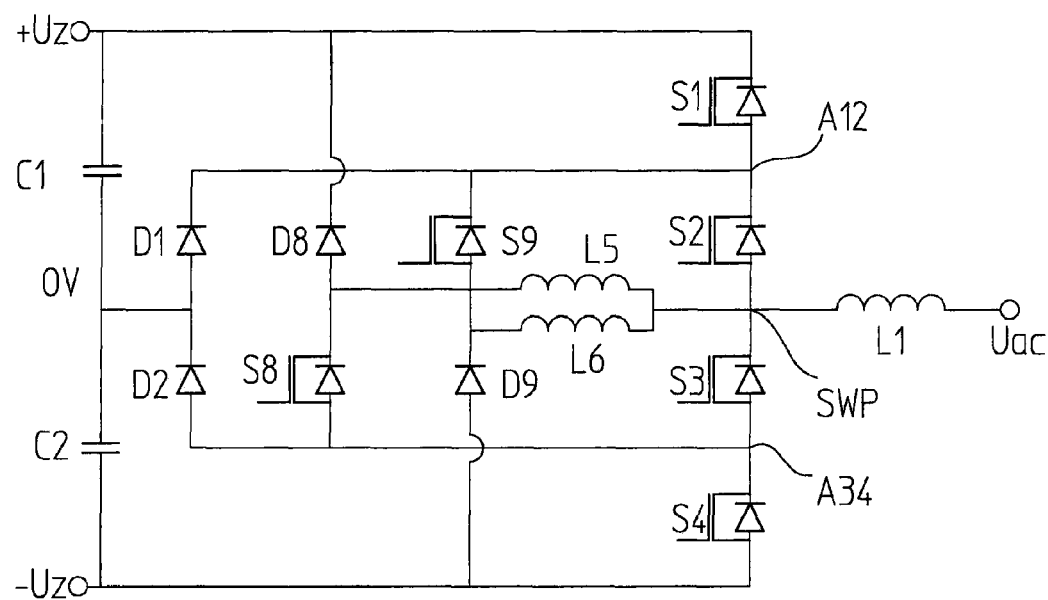
FIG. 5 illustrates a subcircuit of the rectifier for feeding in reactive power.

Another alternative for the circuit extension as illustrated in FIGS. 2a to 2d and FIG. 4 is illustrated in FIG. 5. The joint connection SWP of the second and third semiconductor switches S2, S3 is connected to a fifth choke L5 and a sixth choke L6, the second connection of the fifth choke L5 being connected via an eighth semiconductor switch S8 and via second diode D2 to the median voltage level 0V and via an eighth diode D8 to the positive voltage level +Uz, and the second connection of the sixth choke L6 being connected via a ninth semiconductor switch S9 and via first diode D1 to the median voltage level 0V and via a ninth diode D9 to the negative voltage level −Uz.

This modification, which generally adds a dual configuration of the additional choke L4 to the arrangement illustrated in FIG. 4, avoids problems with the reverse recovery effect that could result in the circuit extension illustrated in FIG. 4 if S8 and S9 are arranged as MOSFETs. When feeding in reactive power during the negative half wave in the power grid, the free-wheeling current accordingly flows via D1 S9 and L6 from the median level 0V into the power grid, and during the positive half wave flows via L5, S8 and D2 from the power grid to the median level.

It should be mentioned once again that the circuit extension explained in FIGS. 1a to 1d for feeding in effective power must be combined with one of the alternatives explained with reference to FIG. 2a to 2d, 4, or 5 for a circuit extension for feeding in reactive power.

Figure 6:
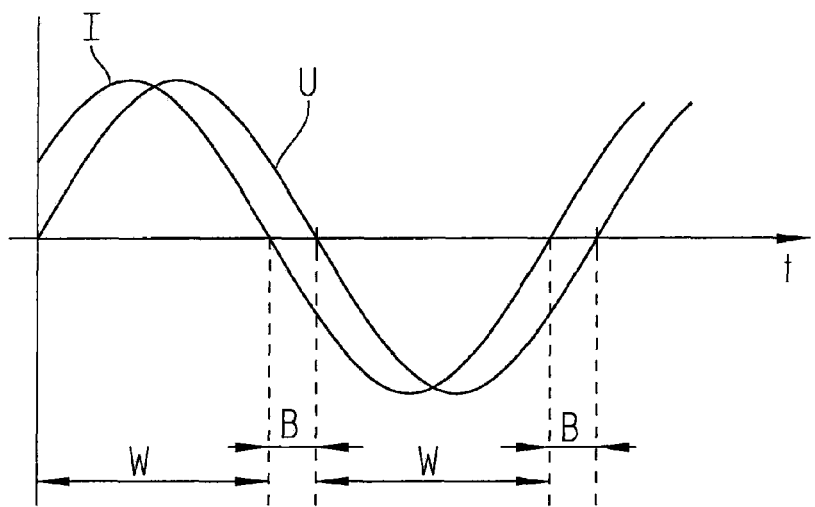
FIG. 6 provides an explanation of effective power and reactive power.

FIG. 6 briefly explains the connections between feeding in effective power and reactive power. If current I and voltage U in the power grid are precisely in phase, then only effective power is conveyed. If inductances or capacitances are active in the power grid, however, then current 1 and voltage U as illustrated in FIG. 6 are no longer in phase, but are rather offset against each other by a certain phase angle. Typically, this phase angle of mutual offset amounts only to a few degrees such that in the larger ranges W the current and the voltage have the same sign. In the ranges B, however, the signs differ, which means that here the direction of energy transport is reversed. That is to say, effective power and reactive power are transported. The time characteristic illustrated in FIG. 6 thus shows four different states, which respectively necessitate a different operating mode of the rectifier. First, in a positive half wave of power grid voltage U, current is fed into the power grid in the positive direction (positive power contribution, referred to here as effective power). Then, when there is a positive grid voltage, the direction of current flow is reversed (negative power contribution, referred to here as reactive power). Subsequently, when there is a negative grid voltage, current continues to be drawn in the negative direction (positive power contribution), and finally, when the grid voltage is negative, the direction of the current is again reversed (negative power contribution). The respective control process of all semiconductor switches of the rectifier for each operating mode is explained above. During one period of the power grid, all four operating modes are thus implemented successively.

Semiconductor switches S1 to S9 may be, e.g., MOSFETs, IGBTs, SiC MOSFETs, or SiC JFETs, which may possibly have to be paired with a separate free-wheeling diode.

All circuits illustrated in FIG. 1a to 1d, 2a to 2d, 4, and 5 concern the infeed into one power grid phase. For a multiphase power grid, the circuit to the intermediate circuit capacitors is accordingly arranged repeatedly.

What is claimed is:

1. A multiphase inverter for selectively feeding effective and reactive power into a power grid having a plurality of phases, comprising:
    a plurality of circuits, each circuit corresponding to a respective phase of each and every one of the plurality of phases of the power grid, each circuit of the plurality of circuits including:
        two series-connected intermediate circuit capacitors, a joint connection of which defines a median voltage level between a positive voltage level and a negative voltage level;
        first, second, third, and fourth semiconductor switches including parallel-connected free-wheeling diodes, located serially in sequence between the positive voltage level and the negative voltage level, a joint connection of the second semiconductor switch and the third semiconductor switch connectable via a choke to the power grid;
        series-connected first and second diodes, a joint connection of which is at the median voltage level, a second connection of the series-connected first and second diodes connected to a joint connection of the first semiconductor switch and the second semiconductor switch, a third connection of the series-connected first and second diodes connected to a joint connection of the third semiconductor switch and the fourth semiconductor switch;
    additional semiconductor switches; and
    additional chokes connected to joint connections of two of the first to fourth semiconductor switches to form, in accordance with the additional semiconductor switches, switchable paths to accept free-wheeling currents, the additional chokes including (a) a first additional choke connected to a joint connection of the first and second semiconductor switches, (b) a second additional choke connected to a joint connection of the second and third semiconductor switches, and (c) a third additional choke connected to a joint connection of the third and fourth semiconductor switches.

2. The multiphase inverter according to claim 1, wherein to accept free-wheeling currents during an output of effective power, the joint connection of the first and second semiconductor switches is connected to a second choke, a second connection of which is connected via a third diode to the median voltage level and via a fifth semiconductor switch to the positive voltage level, and the joint connection of the third and fourth semiconductor switches is connected to a third choke, a second connection of which is connected via a fourth diode to the median voltage level and via a sixth semiconductor switch to the negative voltage level.

3. The multiphase inverter according to claim 1, wherein to accepting free-wheeling currents during an output of reactive power, the joint connection of the second and third semiconductor switches is connected to a fourth choke, a second connection of which is connected via a seventh semiconductor switch to the median voltage level, via a fifth diode to the positive voltage level, and via a sixth diode to the negative voltage level, the fifth and sixth diodes being connected in series and in a blocking direction between the positive voltage level and the negative voltage level.

4. The multiphase inverter according to claim 1, wherein the joint connection of the second and third semiconductor switches is connected to a fourth choke, having a second connection connected via an eighth semiconductor switch and via the second diode, and via a ninth semiconductor switch and via the first diode to the median voltage level, and additionally via a fifth diode to the positive voltage level, and via a sixth diode to the negative voltage level, the fifth and sixth diodes being connected in series and in a blocking direction between the positive voltage level and the negative voltage levels.

5. The multiphase inverter according to claim 1, wherein the joint connection of the second and third semiconductor switches is connected to a fifth choke and a sixth choke, a second connection of the fifth choke being connected via an eighth semiconductor switch and via the second diode to the median voltage level and via an eighth diode to the positive voltage level, and a second connection of the sixth choke being connected via a ninth semiconductor switch and via the first diode to the median voltage level and via a ninth diode to the negative voltage level.

6. The multiphase inverter according to claim 1, wherein the intermediate circuit capacitors are adapted to be fed from a photovoltaic facility.

7. The multiphase inverter according to claim 1, wherein the joint connection of the second semiconductor switch and the third semiconductor switch is connected to the power grid via the choke.

8. A method for operating a multiphase inverter according to claim 1 as a three-point rectifier, comprising:
   switching the joint connection of the second and third semiconductor switches back and forth by switching operations of the first to fourth semiconductor switches according to a voltage in the power grid either between the median voltage level and the positive voltage level or between the median voltage level and the lower voltage level;
   wherein the switching operations of the first to fourth semiconductor switches are accompanied by switching operations of the additional semiconductor switches to connect the additional chokes to the joint connections of the first to fourth semiconductor switches to accept temporarily occurring free-wheeling currents.

9. The method according to claim 8, wherein for feeding effective power into the power grid:
   during a positive half wave of the power grid, the first semiconductor switch is clocked, while the second semiconductor switch remains permanently closed such that following an opening of the first semiconductor switch, a free-wheeling current flows from the median voltage level via the first diode and the second semiconductor switch, and prior to a renewed closure of the first semiconductor switch, a fifth semiconductor switch is closed such that the free-wheeling current that is flowing is overtaken, coming from the positive voltage level and continuously rising, by the second choke via the fifth semiconductor switch such that the joint connection of the first and second semiconductor switches is again at the positive voltage level when the first semiconductor switch is closed again and the fifth semiconductor switch is opened again; and
   during a negative half wave of the power grid, the fourth semiconductor switch is clocked, while the third semiconductor switch remains permanently closed such that following an opening of the fourth semiconductor switch, a free-wheeling current flows from the median voltage level via the second diode and the third semiconductor switch, and prior to a renewed closure of the fourth semiconductor switch, a sixth semiconductor switch is closed such that the free-wheeling current that is flowing is overtaken, coming from the negative voltage level and continuously rising, by a third choke via the sixth semiconductor switch such that the joint connection of the third and fourth semiconductor switches is again at the negative voltage level when the fourth semiconductor switch is closed again and the sixth semiconductor switch is opened again.

10. The method according to claim 8, wherein for feeding reactive power into the power grid:
   during a negative half wave of the power grid, the second semiconductor switch is clocked while the first semiconductor switch is open, and when the second semiconductor switch is closed, a current flows from the median voltage level via the first diode, the second semiconductor switch, and the first choke into the power grid, and, following an opening of the second semiconductor switch, a free-wheeling current flows over the free-wheeling diodes connected in parallel to the third and fourth semiconductor switches, and, prior to a renewed closure of the second semiconductor switch, one of the additional semiconductor switches is closed, such that the free-wheeling current that is flowing is overtaken, coming from the median voltage level and continuously rising, by one of the additional chokes, which is connected to the joint connection of the second and third semiconductor switches, such that the joint connection of the second and third semiconductor switches is again at the median voltage level when the second semiconductor switch is closed again and the additional semiconductor switch is opened again; and
   during a positive half wave of the power grid, the third semiconductor switch is clocked while the fourth semiconductor switch is open, and, when the third semiconductor switch is closed, a current flows from the median voltage level via the second diode, the third semiconductor switch, and the first choke into the power grid, and, following an opening of the third semiconductor switch, a free-wheeling current flows over the free-wheeling diodes connected in parallel to the first and second semiconductor switches, and, prior to a renewed closure of the third semiconductor switch, one of the additional semiconductor switches is closed, such that the free-wheeling current that is flowing is overtaken, coming from the median voltage level and continuously rising, by one of the additional chokes, which is connected to the joint connection of the second and third semiconductor switches, such that the joint connection of the second and third semiconductor switches is again at the median voltage level when the third semiconductor switch is closed again and the additional semiconductor switch is opened again.

* * * * *